United States Patent [19]

Christiansen

[11] 3,830,982

[45] Aug. 20, 1974

[54] TIME DIVISION MULTIPLEX DATA TRANSMISSION SYSTEM HAVING A MONITORING SIGNAL

[75] Inventor: Hans-Martin Christiansen, Munich, Germany

[73] Assignee: Siemens Aktiengesellschaft, Berlin & Munich, Germany

[22] Filed: Apr. 9, 1973

[21] Appl. No.: 348,900

[30] Foreign Application Priority Data

Apr. 14, 1972 Germany .......................... 2218128

[52] U.S. Cl. ....... 179/15 AE, 179/15 BF, 179/15 BS

[51] Int. Cl. ........................................ H04j 3/14

[58] Field of Search ....... 179/15 AD, 15 AE, 15 BF, 179/15 BD, 15 BS, 15 BY; 178/69.5 R

[56] References Cited

UNITED STATES PATENTS

| | | | |
|---|---|---|---|
| 2,912,508 | 11/1959 | Hughes | 179/15 AD |
| 3,739,098 | 6/1973 | Camiciottoli | 179/15 BF |

*Primary Examiner*—Ralph D. Blakeslee

*Attorney, Agent, or Firm*—Hill, Gross, Simpson, Van Santen, Chiara & Simpson

[57] ABSTRACT

A data transmission system, in particular a time division multiplex (TDM) pulse code modulation (PCM) system, in which a continuous sequence of individual signals is transmitted includes a transmission path extending between two end stations which is divided into a plurality of sections and in which a monitoring signal is interposed at regular intervals into the sequence of transmitted signals. At the start of each transmission section, as viewed in the direction of transmission, the monitoring signal is either reconstructed or reinserted in the correct form independently of whether it has been received at this station in a disturbed form or in the correct form by way of the preceding transmission section. The monitoring signal is a pulse signal containing a plurality of bits. At the start of each transmission section only some of the bits of the monitoring signal are reconstructed or reinserted in the correct form, while the remaining uncorrected bits of the monitoring signal are employed for fault rate analysis and/or for message and alarm functions.

5 Claims, 8 Drawing Figures

| GA | SA: A | B | C | D | E | F | G |
|---|---|---|---|---|---|---|---|
| A-B V | | 3 | 3 | | | | |
| A-B III | | 1 | | | 4 | | |
| B-C III | | | 1 | | 4 | | |
| C-D | | | | 1 | 1,2,3,4,5 | 1 | 2 |
| D-E | | | | | 1,2,3,4,5, | 1 | 2 |
| E-F I | | | | | | 1 | |
| F-G IV | | | | | | | 2 |

TIME DIVISION MULTIPLEX DATA TRANSMISSION SYSTEM HAVING A MONITORING SIGNAL

BACKGROUND OF THE INVENTION

1. Field of the Invention

The present invention relates to data transmission systems, in particular to time division multiplex data transmission systems, and more specifically to time division multiplex data transmission systems which employ a monitoring signal.

2. Description of the Prior Art

A data transmission system has previously been proposed in which a continuous sequence of individual signals is transmitted over a transmission path which extends between two end stations and which is divided into a plurality of sections, and in which a monitoring signal is interposed at regular intervals into the sequence of transmitted signals, wherein at the start of each transmission section, considered in the direction of transmission, the monitoring signal is either reconstructed or reinserted in the correct form, independently of whether it has been received at this station in a disturbed form or in the correct form via the preceding transmission section. In this connection, one may make reference to German patent application P 22 01 498.8; the corresponding British patent application 1998/73 may also be a reference.

SUMMARY OF THE INVENTION

An object of the present invention is to provide, in a system of the type described above, reconstruction or reinsertion of some of the bits of the monitoring signal and to utilize the remaining uncorrected bits of the monitoring signal for fault rate analysis and/or for message and alarm functions.

According to the present invention, there is provided a data transmission system in which a continuous sequence of individual signals is transmitted by way of a transmission path which extends between two end stations. The transmission path is divided into a plurality of sections and a monitoring signal is interposed at regular intervals along the transmission path into the sequence of transmitted signals, wherein at the start of each transmission section, considered in the direction of transmission, the monitoring signal is either reconstructed or reinserted in the correct form, independently of whether it has been received at this station in a disturbed form or in the correct form from the preceding transmission section. The monitoring signal is a pulse signal containing a plurality of bits, wherein at the start of each transmission section only some of the bits of the monitoring signal are reconstructed or reinserted in the correct form, and wherein the remaining uncorrected bits of the monitoring signal are used for other purposes including fault rate analysis and/or message and alarm functions.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

GENERAL DESCRIPTION

Figure 1:
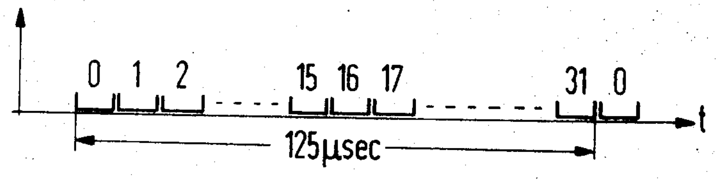
FIG. 1 is a time diagram illustrating the basic type of pulse frame of a system constructed in accordance with the principles of the present invention.

A proposed system constructed in accordance with the principles of the present invention is of particular significance with respect to PCM transmission devices currently being introduced under the system name PCM 30/32. For this reason, a discussion of the fundamental principles of the proposed system is offered as an aid in understanding the present invention.

In each of the directions of transmission, the individual PCM link consist of a plurality of sections. The basic type of pulse frame employed in this connection is represented in the time diagram illustrated in FIG. 1. The duration T of one frame amounts to 125 microseconds. It comprises 32 code words each having 8 bits, the first code word being assigned the number 0 and the 32nd code word being assigned the number 31. Within an individual frame, the code words 1 to 15 and 17 to 31 each serve to transmit signals in one speech channel. The code word 0 serves as a frame synchronizing word RSW, but in such a way that in the event of directly consecutive frames, as illustrated in the time diagram of FIG. 2, it is transmitted only in each second frame. In the inbetween frame, the frame synchronizing word is in each case replaced by a code word (message word MW) which contains messages for the individual multiplex channels 1 to 15 and 17 to 31. The code word 16 serves as a characteristic transmission channel and, in fact, in that in the frame 0 it serves for the synchronization of a super frame formed by this characteristic transmission and in addition serves to transmit messages relating to the super frame of the characteristic transmission channels. In frame 1 the code word 16, which comprises a total of eight bits, serves, in each case with four bits, for characteristic transmission for the speech channel 1 and for the speech channel 17; in the frame 2 the code word 16 serves for the characteristic transmission of the speech channels 2 and 18, etc, until, finally in the frame 15, the code word 16 serves for the characteristic transmission of the speech channels 15 and 31. Subsequently, the super frame formed by the code words 16 of the frames 0 to 15 is repeated.

Figure 3:
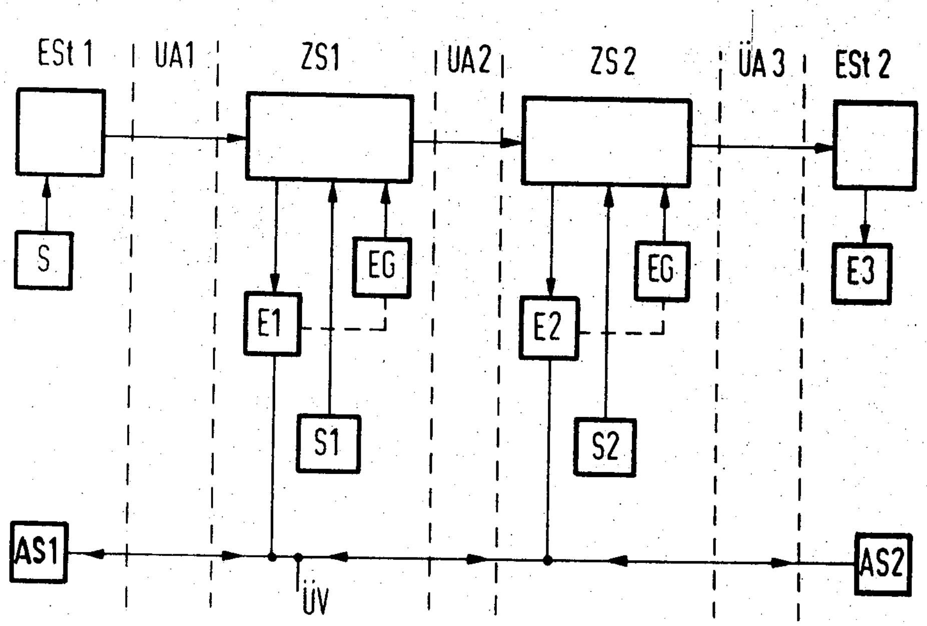
FIG. 3 is a block circuit diagram of a transmission system constructed in accordance with the present invention.

Referring to FIG. 3, a schematic block circuit diagram of a transmission system constructed in accordance with the above-mentioned proposal is illustrated. The data transmitting system shown in FIG. 3 comprises a transmitting end station ESt 1 and a receiving end station ESt 2. The two end stations are connected by way of a pair of intermediate sections ZS1 and ZS2, so that there are three transmission sections UA1, UA2 and UA3.

It should be noted that in order to simplify the illustration of the transmission system only one transmission path has been represented, and not the return connection, which, however, is formed in exactly the same manner.

Figure 2:
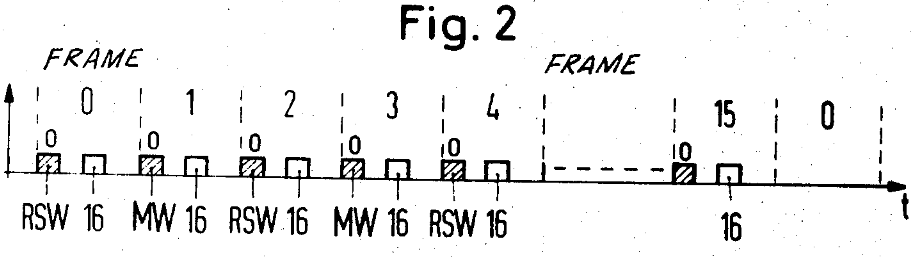
FIG. 2 is a time diagram illustrating the interposition of a message word in place of a frame synchronizing word.

The transmitting end station ESt 1 transmits a bit sequence which is constituted in accordance with FIGS. 1 and 2 and, therefore, will not be further explained at this point. The interposition of the frame synchronizing word RSW is effected in the transmitting end station ESt 1 by means of a generator S. In the intermediate station ZS1 there is provided a receiver E1 which receives the frame synchronizing word RSW and checks it for correct reproduction. The receiver E1 seeks the frame synchronizing word from the received bit sequence, in order to perform such checking. If the received frame synchronizing word RSW deviates from the stipulated form, this is an indication that the transmission quality in the transmission link has become reduced and that an increase in the fault rate in the preceding section has occurred. Furthermore, the receiver E1 provides that before the transmission of the bit sequence from the intermediate station ZS1 to the intermediate station ZS2 the frame synchronizing word RSW contained in the bit sequence is corrected to the prescribed word form. Another advantage in accordance with the theory of the aforementioned application resides in the fact that the receiver E1 ensures that the frame synchronizing word RSW is first of all totally gated out of the received bit sequence before the transmission to the intermediate station ZS2, and then, by means of an additional transmitter S1, which emits the prescribed frame synchronizing word, the blank space in the bit sequence is filled in. Accordingly, a receiver and a transmitter for the frame synchronizing word are provided in the intermediate station ZS2. These carry the respective reference characters E2 and S2. In the end station ESt 2 there is provided only a corresponding frame synchronizing word receiver E3.

In this way it is provided that each transmission section is independently fully checked with respect to its functioning capacity and correct transmission. The operating criterion which is thus obtained at the end of a transmission section can therefore and particularly easily be employed to indicate a possibly disturbed transmission section at one or both end stations. This is shown in FIG. 3 by a monitoring line UV, the end of which open into analyzing circuits AS1 and AS2. These analyzing circuits can be employed to analyze fault messages in terms of specific sections, and possibly to initiate a transfer, of individual sections, to standby equipment. The monitoring line UV can, for example, take the form of the service channel in a TDM system itself, or can be a separate link or line.

In the transmission system described above, a clear identification of the particular transmission section is obtained whenever the actual bit flow over the transmission link is still in existence. Any disturbance will then become manifest as an increase in the fault rate, which inevitably also affects the frame synchronizing word serving for monitoring purposes, and thus, at a certain fault frequency, triggers the criterion for the fault message. Circumstances differ, however, in the case of a total break in a line section, because in such a case the sections following the disturbed sections, considered in the direction of transmission, do not obtain the bit sequence and it is therefore no longer possible to gate in the frame synchronizing word or to renew the frame synchronizing word. According to a proposal in the aforementioned application, this difficulty is overcome in that each intermediate station is provided with a substitute pulse generator, in a known manner, which is activated whenever no bit sequence or only a very disturbed bit sequence is received from the preceding section of the transmission link. In the exemplary embodiment shown in FIG. 3, these substitute pulse generators are referenced EG in the intermediate stations ZS1 and ZS2. To indicate that their connection is derived from the received signal of the intermediate station, a corresponding control connection to the particular frame synchronizing word receiver is provided.

The monitoring system explained above can also be used whenever a continuous bit flow, for example a data bit flow is transmitted from the end station ESt 1 to the end station ESt 2, in place of a TDM signal composed of a number of speech channels. In this case, it is now only necessary to interpose a check word corresponding to the frame synchronizing word at regular intervals of time into the data bit flow.

Starting from the earlier system proposal, one aim of the invention is to additionally effect a fault rate analysis of the entire transmission path, at the particular receiving end station, and to possibly trigger an alarm.

The aforementioned aim on which the present invention is based consist in the detection and the analysis of the following operating states:

*a*. Breakdown Of A Connection

In the event of the breakdown of the connection, in all cases the receiving end station should transmit an alarm, and in the case of connections comprising several sections, the intermediate station which follows the disturbed section should also transmit an alarm.

*b*. Fault Rate

It should be possible to individually measure and monitor the fault rate occurring over the entire connection and the fault rate occurring in each individual section, in order that when the fault rate exceeds a predetermined value, without a total breakdown, a so-called non-urgent alarm may be emitted from the end station or from the intermediate stations.

*c*. Signaling Of Alarms To Opposite End Stations

In the case of a nondisturbed connection, it should be possible to signal an urgent and a non-urgent alarm from one end station to the opposite end station by way of the entire connection link.

These aims should be realized without any modification of the pulse frame construction set forth by the Comite Consultatif International Telephonique et Telegraphique (CCITT).

Before going further, certain terms should be at least generally defined. Specifically, these terms are "urgent alarm" and "non-urgent alarm."

Urgent Alarm

An urgent alarm is an indication which is provided when a disturbance exists in the transmission path which necessitates a switch-over or transfer to a free standby device. A typical example of this type of disturbance is a total breakdown of one section of the transmission link.

Non-Urgent Alarm

A non-urgent alarm is an indication which is provided whenever there is a disturbance in the transmission path which is bearable, but still noticeable. A typical example of this type of disturbance is the increase in the fault rate beyond the values stipulated by the frame specifications of, for example, the German Post Office.

In a system constructed in accordance with the present invention, a monitoring signal, which is preferably formed by a frame synchronizing word, is employed in a similar fashion to that of a line pilot in carrier frequency system. However, the essential difference exist that a line pilot is a separate signal relative to the actual carrier frequency signal, whereas the use of, for example, the frame synchronizing word as a monitoring signal is an additional use of a signal which already serves for other purposes. If a frame synchronizing word is additionally employed for the monitoring of sections of, for example a PCM 30 link, then it is provided that of, for example, 7 bits provided for synchronization purposes, the intermediate station analyzes only $n$ bits, gates the latter and transmits them, regenerated, in the following section, while the remaining $m = 7 - n$ bits pass normally through the intermediate section. The $n$ bits which are gated out of the intermediate station and then gated in again serve for the purpose of monitoring, in terms of sections, e.g. fault rate measurement, fault rate alarms, and breakdown alarm. The $m$ bits which has passed through serve to monitor the overall transmission path. In the event of a disturbance, i.e. when an intermediate station repeatedly receives the $n$ bits of the preceding section in a faulty fashion, a frame synchronizing generator produces a complete synchronizing word in which, however, the logic value of at least one of the bits is inverted, and transmits this synchronizing word to the following section.

Figure 4:
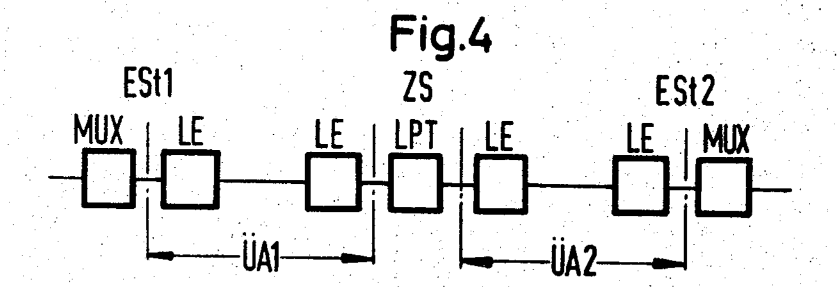
FIG. 4 is a block circuit diagram of a part of a data transmission system constructed in accordance with the present invention.

The system illustrated in FIG. 4 comprises two PCM multiplex devices MUX, four PCM line end devices LE and one line pilot device LPT. The end stations ESt 1 and ESt 2 shown in FIG. 3 correspond in FIG. 4 to a PCM multiplex device MUX and an associated PCM line end device LE, whereas the intermediate stations of FIG. 3 correspond to a line pilot device LPT and two associated line end devices LE. The line end devices LE are devices which prepare the bit flow for transmission from a transmitting station to the next receiving station. They can, for example, be pulse shaping devices in the event that the transmitting station is connected to the receiving station by way of a coaxial cable or a line. The line end devices LE can also be radio relay devices which replace the line or the cable. The multiplex device MUX is a conventional TDM device which telescopes or multiplexes the 30 or 32 channels of the PCM system.

The system, which is to be described below, is based on the assumption that the intermediate station analyzes and regenerates a part, for example, $n = 6$ bits of the frame synchronizing word, and, furthermore, that at least $m = 1$ bits passes from one end station to the other end station. The analysis of 6 bits in the intermediate station possesses the advantage that the intermediate station synchronizing device can operate virtually as rapidly as the multiplex device and that the analyzing circuit for the frame synchronization operation is substantially identical to that of the multiplex device.

END STATION

The multiplex device of the end station carries out the following monitoring functions which are of interest in this particular context:

Transmitting Direction

In consecutive pulse frames of the time channel 0, the multiplex device alternately transmits one frame synchronizing word RSW and one message word MW in accordance with the following distribution of the bits for the frame synchronizing word RSW and the message word MW at the output of an end station ESt:

| Bits | 1 | 2 | 3 | 4 | 5 | 6 | 7 | 8 |
|---|---|---|---|---|---|---|---|---|
| Frame Synchronizing Word RSW | X | 0 | 0 | 1 | 1 | 0 | 1 | 1 |
| Message Word MW | X | 1 | D | N | X | X | X | X |

X is not used for synchronization or signaling and is available for yet unspecified purposes. As long as X is not required, its logic value is 1.

In the message word, the bit in the position 2 is a 1, so that no frame synchronizing word can be simulated, and the bit "D" in the position 3 is normally a 0; it is to become a "1" when an urgent alarm occurs in the multiplex device.

For the frame synchronization, the bit positions 2 to 8 of the frame synchronizing word and the bit position 2 of the message word are analyzed. In the message word, the bit D serves to signal an urgent alarm, and the bit N serves to signal a non-urgent alarm to the opposite station.

Receiving Direction

The occurrence of faulty frame synchronizing words which contain one or more erroneous bits, can be observed at a measuring unit by means of a meter. Furthermore, when a fault rate of approximately $10^{-4}$ is exceeded, a non-urgent alarm occurs. If three faulty frame synchronizing words occur consecutively, the "synchronism breakdown" (urgent alarm) is indicated, resynchronization is initiated and the decoder is blocked.

The message word can only be analyzed as long as frame synchronization exist. It cannot be used for purposes of the pilot monitoring in accordance with the invention without a modification of the multiplex device.

INTERMEDIATE STATION

Figure 5:
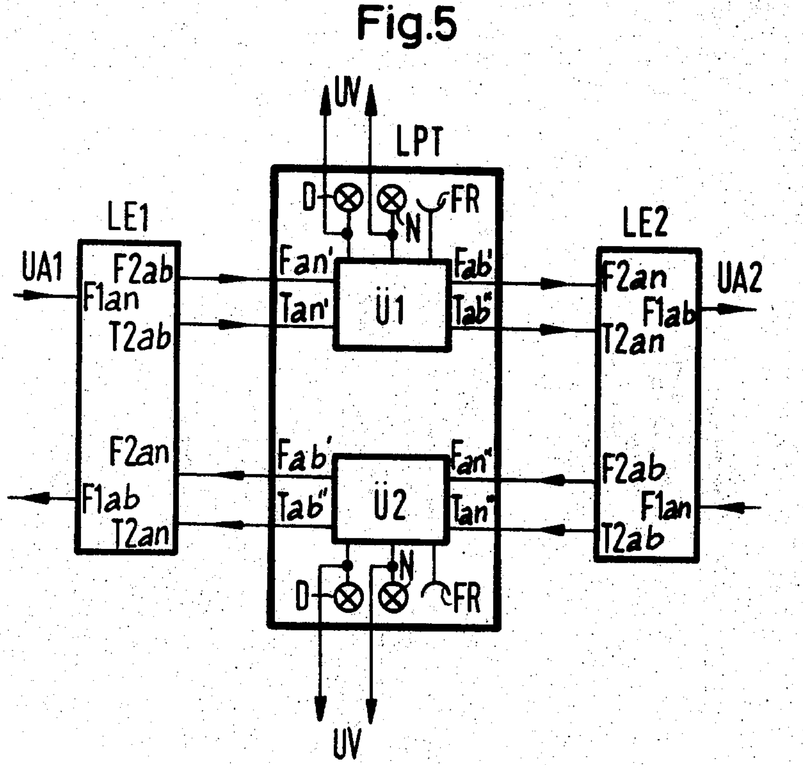
FIG. 5 is a more detailed block circuit diagram of an intermediate station which forms a part of the system illustrated in FIG. 4.

Referring to FIG. 5, the line pilot device LPT contains two identical monitoring units U1 and U2 for the two directions of transmission. The line pilot device LPT is connected with its data and pulse train lines directly to the adjacent line end devices LE.

The intermediate station illustrated in FIG. 5 comprises the line end devices LE1 and LE2 and the line pilot device LPT. The line end devices LE1 and LE2 correspond to the devices LE in FIG. 4. The line end devices LE1 and LE2 each have an incoming trunk line F1*an* and an outgoing trunk line F1*ab* of these sections. The pulse train frequency of the bit flow is in each case obtained in the line end devices of the incoming direction and transmitted to the line pilot device LPT. Consequently, the pulse train is fed from the line end device LE1 via an output T2*ab* to the monitoring unit U1 of the line pilot device LPT, in parallel to the actual bit flow which passes by way of an output F2*ab* from the line end device LE1 to the monitoring unit U1. In the monitoring unit U1, the aforementioned analysis is effected with respect to the frame synchronizing RSW and the message word MW. This means that 6 bits of the frame synchronizing word and the second bit of the message word are analyzed. The analysis of fault rate also takes place as stated above, and can be indicated by way of a terminal FR. The device represented enables, via the output lines UV, the so-called central operational monitoring unit to be provided with the corresponding data. A central operational monitoring unit ZBU is understood to be, for example, by the German Post Office as a special monitoring system and a line network which serves only for the operational monitoring of the device.

Figure 6:
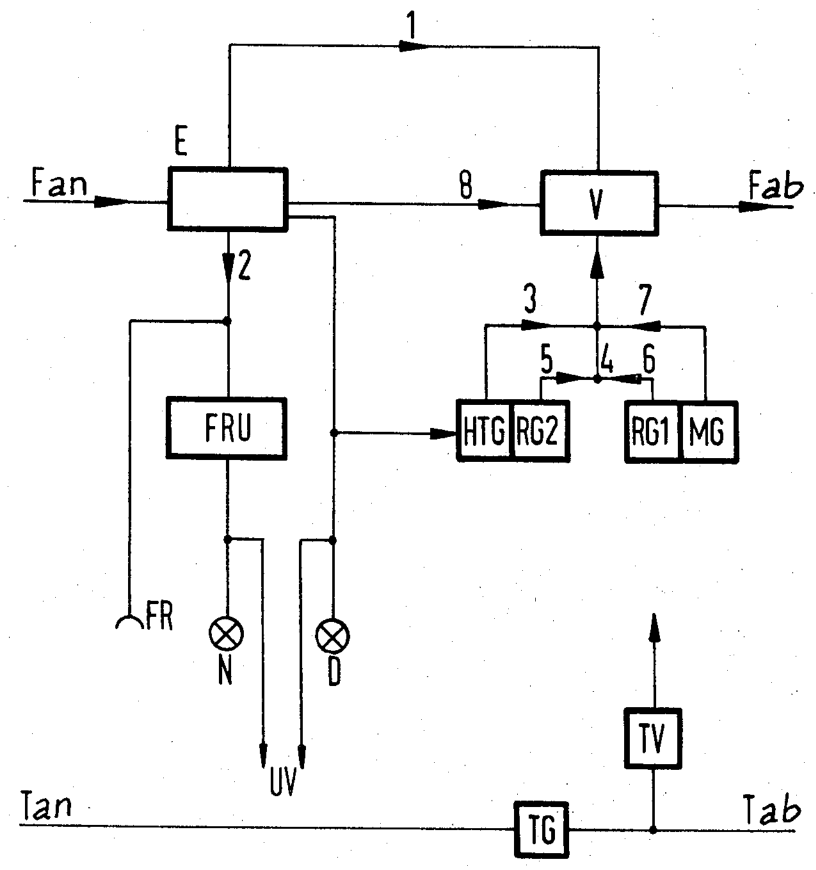
FIG. 6 is a more detailed block circuit diagram of a monitoring unit which form a part of the station illustrated in FIG. 5.

From the pulse flow arriving at an input Fan, the monitoring unit (as shown in FIG. 6) with the aforementioned frame synchronizing word receiver E analyzes the small $n$ bits which are to be analyzed from the frame synchronizing word RSW. In the present case, in which $n = 6$, these are the bits at the bit positions 2, 3, 4, 6, 7 and 8. The monitoring unit also analyzes at least the bit position 2 of the message word MW. For this purpose, the frame synchronizing word receiver E is synchronized to the $n$ bits of the frame synchronizing word RSW and the second bit of the message word MW. Synchronization is necessary in order to gate the $n$ bits of the frame synchronizing word RSW and the second bit of the message word MW out of the pulse frame, to renew these bits and to be able to gate them back into the pulse flow emitted at an output Fab. The $n$ bits of the frame synchronizing word RSW are reconstructed by a generator RG1 and the second bit of the message word MW is reconstructed by a generator MG. The renewal of the bits in the position 2 of the message word MW simplifies the synchronization of the following intermediate stations within the link, and of the end station, even in the case of an increased fault rate.

In the monitoring unit illustrated in FIG. 6, the input Fan is again to be understood as a trunk line having the incoming bit flow and the output Fab is to be understood as the trunk line with the emitted bit flow. A terminal FR represents a terminal which is provided for fault rate monitoring, while a luminous diode N is provided to indicate a non-urgent alarm, and a luminous diode D is provided to indicate an urgent alarm. The lines UV connect the luminous diodes N, D to a central operational monitoring unit, as previously indicated. A synchronizing device is contained in a unit B, which corresponds substantially to the synchronizing circuit of the multiplex device MUX. In the event of synchronization, the pulse flow which contains the data is transmitted from the unit E by way of the line 1 to a distributor unit V, and in the event of a breakdown in synchronism, the luminous diode D, the auxiliary pulse generator HTG and the generator RG2 are connected, and the synchronizing device E also controls the distributor V via the control line 8, so that in the event of a fault only the link 4 is connected to the output Fab. When there is no fault, the lines 1 and 4 are connected to the output Fab. The generator RG1 is provided for the $n$ bits of the frame synchronizing word RSW, for example, the bit positions 2, 3, 4, 6, 7 and 8, while the generator RG 2 is provided to emit an inverted check bit (within the $m$ bits) via the line 5. The lines 5 and 6 from the generators RG2 and RG1, respectively, are combined by the line 4. The generator MG is understood to be the generator for the message word MW and is connected by way of the line 7 to the distributor V. The pulse train line circuit which forms part of the intermediate station as shown in FIG. 5 is illustrated in the lower portion of FIG. 6. The pulse trains incoming to this apparatus at the input Tan control a pulse generator TG which emits the pulse trains with the prescribed pulse shape to the pulse trains supply circuit TV. These pulse trains are also conducted by way of the line Tab to the line end device LE2.

The fault rate of the section located before the line pilot device LPT may be measured by a unit connected to the output FR, which emits a pulse whenever one or more of the bits of the frame synchronizing word which are analyzed in the line pilot device are falsified. If the fault rate exceeds a given limit value (this value is affixed, for example, at $10^{-4}$ in the multiplex device) a non-urgent alarm situation arises which is indicated, e.g. by a luminous diode N.

If the frame synchronizing word RSW is received in a faulty condition for a longer period of time, so that the synchronizing device cannot establish frame synchronism, an urgent alarm is emitted, e.g. by means of a luminous diode D. At the same time, the previous bit of the frame synchronizing word RSW is reinserted with an inverse logic value into the frame synchronizing word (the generator RG2 in FIG. 6) and with respect to sections in which the HDB3 code cannot be used (e.g. in radio relay sections), in addition, a simple auxiliary pulse generator HTG initiates the transmission of a suitable pulse train, e.g. 010101... as "pseudo-information" at the output Fab to the following section. This auxiliary pulse generator corresponds to the standby generator EG shown in FIG. 3.

The frame synchronizing word at the output of the intermediate station consequently possesses the following bit distribution:

| Bit Position | 1 | 2 | 3 | 4 | 5 | 6 | 7 | 8 |
|---|---|---|---|---|---|---|---|---|
| Operational State | | | | | | | | |
| Continuous | | | | | 1 | | | |
| Produced by RG1 | X | 0 | 0 | 1 | | 0 | 1 | 1 |
| Disturbance | | | | | | | | |
| Produced by RG1 | X | 0 | 0 | 1 | | 0 | 1 | 1 |
| by RG2 | | | | | 0 | | | |

Note: X is not used for synchronization. Logic value of $x = 1$.

The urgent and non-urgent alarms can be indicated not only by luminous diodes in the line pilot device, but also by signal devices of the intermediate station (amplifier station or exchange), and they can also be detected by a central operational monitoring unit.

The monitoring unit obtains the necessary pulse trains from a pulse train supply V, whose pulse generator TG is controlled by way of the input Tan with the pulse train of the series-connected line end device LE.

The pulse train produced by the pulse generator TG is transmitted by way of the line Tab to the subsequently connected line end device, even when the input pulse train at the input Tan is missing.

APPLICATION IN A PCM NETWORK

Figures 7, 8:
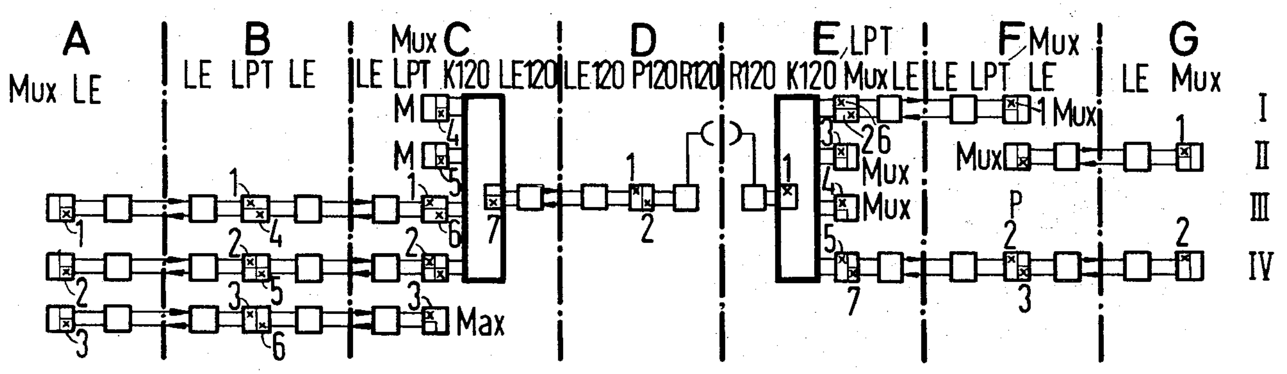
FIG. 7 is a block circuit diagram of a PCM network constructed in accordance with the present invention.
FIG. 8 is a table illustrating faults which can occur in the PCM network of FIG. 7.

In the PCM network illustrated in FIG. 7, four PCM 30 connections are conducted over a PCM 120 link which contains one line section and one radio relay section. A combiner K120 combines four 30 channel pulse flows to form a 120 channel pulse flow. At the same time, it exerts the monitoring function of the PCM 120 end station in a similar fashion to the multiplex device of a PCM 30 end station. The line pilot devices LPT are always interposed between two line end devices of adjacent sections, between line end device LE120 in PCM 120 and radio relay device R120 (junction point D from cable to radio relay) or between the combiner 120 in PCM 120 and the line end device of the continuing PCM 30 section (PCM 120 end stations in sections C and E.

Part of a PCM 30 connection conducted over a PCM 120 arrangement should be considered from the input of the combiner K120 to the output of the combiner of the opposite station fundamentally as one single PCM 30 section.

In the construction of the PCM network illustrated in FIG. 7, the individual transmission sections are referenced A to G. In addition, in the PCM multiplex devices MUX and the PCM 30 line pilot devices LPT are represented the luminous diodes which serve for fault indication. These diodes are marked with small arabic numerals and an *x*. Further luminous diodes are arranged in the combiner K120 of the PCM 120 network and the line pilot device P120 of the PCM 120 network. The combiner of the PCM 120 network interlocks four pulse frames of the PCM 30 network with 30 speech channels, at the transmitting end, to form a new pulse frame with 120 speech channels and, in addition, adds a new frame synchronizing word and a new message word. At the receiving end, the combiner K 120 converts the pulse frame, which possesses 120 speech channels, back into four pulse frames with, in each case, 30 speech channels. The two radio relay devices R 120 effect the transmission between these sections D and E.

FIG. 8 illustrates examples for the indication of faults, the letters A to G relating to the transmission sections illustrated in FIG. 7; the disturb section is represented in the left-hand column GA, whereas the fault indication in the particular section is represented on the right-hand side at SA.

If a PCM 30 link is to transmit data signals exclusively, in place of telephone signals, the multiplex devices can be replaced by data devices which, similarly to the multiplex device of a PCM 30 arrangement, alternately gates one frame synchronizing word and one message word into the outgoing pulse flow, and at the receiving end, analyzes the failure of the frame synchronizing word to appear or changes the frame synchronizing word and emits an alarm. The mode of operation of the above system will be discussed in the following.

BREAKDOWN OF A CONNECTION

A1. Breakdown Of An End Section

In the event of a breakdown in the end section F–G of the PCM link A–G (FIG. 7), the same effect occurs at the section G in the multiplex device IV as in the multiplex device II, in the event of breakdown of the link F–G II consisting of only one section. The synchronizing device cannot synchronize, it reports urgent alarm, blocks the decoder and in the bit D emits a fault message to the opposite station. The characteristic converter device which also can no longer synchronize, initiates the clearance of existing conversation connections and the blockage of new seizures.

The service personnel recognize the line disturbance by the illumination of a luminous diode provided for "breakdown in synchronism" in the multiplex device.

A2. Breakdown Of An Intermediate Section

If the same condition (A–G IV) is interrupted as a result of the breakdown of the section E–F IV, then the line pilot device in the section F can no longer synchronize and indicates this condition by an urgent alarm which can be passed on by way of a central operational monitoring unit. At the same time, the line pilot device in the section F transmits a piece of pseudo data (possibly for synchronizing purposes) and a complete frame synchronizing word. This word, however, has been falsified by inverting the bit in the position 5. This results in the alarm "breakdown in synchronism" at the end station which indicates the line disturbance and instigates the processes described above.

Correspondingly, in the event of a breakdown of the section B–C, of the same link (A–G IV), the line pilot device in the section C reports the section breakdown. The frame synchronizing word which is gated into the section C again now leads to an alarm in the multiplex device in section G IV, for the line pilot devices in sections E and F do not analyze the bit of the frame synchronizing word falsified in the section C. Generally speaking, the above solution presents the advantage that only the line pilot device reports the fault at the end of the disturbed section, whereas all following line pilot devices do not. Nevertheless, in the end stations, the channels affected by the fault can be blocked or cleared by normal exchange techniques.

A3. Breakdown Of The PCM 120 Connection

In the event of a breakdown of the section C–D of the PCM 120 link C–E, similar processes are completed as in the case of the breakdown of a PCM 30 section. The line pilot device in section D and the combiner K 120 in the section E report the condition "breakdown in synchronism," i.e. line fault.

At the same time, the PCM 30 line pilot devices E I, IV, and the multiplex devices E II, III, F I and G IV report "breakdown in synchronism", i.e. line fault. The fault indications 2 and 5 in the section E are actually superfluous. They could be suppressed by not connecting the relevant outputs of the line pilot devices

B. Fault Rate Monitoring And Measurement

The fault rate which arises in the individual line section as a result of alien interference sources or crosstalk can be measured on each line pilot device (unit connected to the output FR, FIG. 6). Also, the line pilot device emits a non-urgent alarm when the fault rate exceeds a given limit value.

In the same way, the total of the fault rates of the last line section and of the total link may be determined in the multiplex device. As six bits are analyzed from the last section and only one bit is analyzed from the overall link in this process, the influence of the last line section predominates in the fault rate measurement and monitoring process.

The possibility of measuring only the fault rate of the preceding section at a measuring station, provides a clearer statement of operational condition than the measurement of the fault rate added up over all the previous sections, for the purpose of locating a line section with an increased fault rate.

The additional analysis of the fault rate of the last line section relative to the fault rate of the overall link arises in the multiplex device from the intention of handling all sections equally and is in no way a nonvariable feature of the proposed system. It can be omitted if the line pilot device is designed in such a way that in the event of every individual incorrectly received frame synchronizing word (instead of merely in the event of a breakdown in synchronism, i.e. a sequence of three incorrectly received frame synchronizing words), the non-analyzed bit of the frame synchronizing word is replaced by one having an inverted logic value. In this way the fault rate which occurs in the 6 bits which do not pass straight through the arrangement is transposed into the bit which does pass straight through in such a manner that the multiplex device analyzes the fault rate which results along the entire link in all 7 bits of the frame synchronizing word. Also in the realization, the fault rate attributed solely to the prior section can be determined in each intermediate station. In the end station, on the other hand, the fault rate of the overall link now appears on the measuring unit without reduction, and consequently the fault rate of the last section may be measured only when the end device contains special devices. Accordingly, the end station now triggers the alarm when the fault rate of the overall link exceeds the prescribed threshold value of $10^{-4}$.

C. Remote Monitoring

The proposed process of falsifying the frame synchronizing word which passes through the intermediate station, in the case of the fault, possesses the advantage that the multiplex devices, in their normal design stipulated by CCITT recommendations and by the specifications of agencies such as the German Post Office, initiate the necessary following effects, and always indicate line disturbances in a standard form by the luminous diode "breakdown in synchronism" alarm, irrespective of whether the link contains only one or several line sections, or whdshdq hs hs dquhoodd whth line pilot devices or not. However, with this process it is ruled out that in the event of a disturbance, the line pilot device can directly transmit a message with the bit D of the message word to the end station, because in the non-synchronous state, this end station does not analyze the message word. A fault message from an intermediate station must therefore be transmitted by way of a separate remote monitoring unit, e.g. a central operational monitoring unit. A transmission by a bit D in the forward direction would, moreover, contradict the significance of this alarm "opposite station reporting breakdown" of the relevant direction of transmission. A backwards message with the bit D from the line pilot device is superfluous because a report of this kind has already been initiated by the receiving end station.

D. Reliability Of The System In The Event Of The Simulation Of Signals

The proposed system supplies a favorable report only when the frame synchronizing word and one bit of the message word are received without falsification at the correct time. Therefore, the process is considerably less sensitive to simulation of signals than a process in which a favorable report is obtained merely as a result of the arrival of a pulse train with the correct frequency, or as a result of the adherence to coding regulations.

The risk that, under particularly unfavorable conditions (low crosstalk attenuation, low field attenuation and intermediate regenerators with automatic distortion correcting characteristics), in the event of a fault a line pilot device will pick up a signal simulated by crosstalk instead of the missing effective signal, will synchronize to this simulated signal and, thus, will not report the line break, is no greater than the risk of the same signal simulation in the multiplex device at the end of one single line section. If special provisions in the multiplex device (e.g. address set-up by means of freely selectable bits of the message word) are to be dispensed with for this simple, but very frequent case of use, than such measures would also appear to be unnecessary in the use of line pilot devices.

Furthermore, the danger of signal simulation can almost always be avoided by correct planning of the link.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A data transmission system comprising a pair of end stations, a transmission path extending between and connecting said end stations, said transmission path divided into a plurality of transmission sections, means for transmitting a continuous sequence of individual signals over said transmission path, means for interposing a monitoring signal at regular intervals into the sequence of signals to be transmitted, means at the start of each transmission section considered in the direction of transmission for reconstructing said monitoring signal independently of whether it was received at that point in a disturbed form or a direct form from the preceding transmission section, said monitoring signal being a pulse signal containing a plurality of bits, and wherein said means for reconstructing said monitoring signal including means for reconstructing some of the bits of the monitoring signal and reinserting the same in correct form in the transmitted sequence of signals and means responsive to the remaining uncorrected bits of said monitoring signal for indicating fault conditions.

2. A data transmission system as claimed in claim 1, comprising intermediate stations between adjacent ones of said transmission sections and means responsive to a transmission fault represented by the uncorrected bits of said monitoring signal for inverting at least one bit in the uncorrected part of said monitoring signal.

3. A data transmission system as claimed in claim 2, comprising multiplex means operable to provide time division multiplex operation of said data system, means for detecting frame synchronization of the multiplex operation and wherein said means for inverting at least one bit in the uncorrected part of the monitoring signal includes means operable to provide such bit inversion in response to a frame synchronization fault.

4. A data transmission system as claimed in claim 2, comprising time division mutliplex means for operating said transmission system on a time division multiplex basis, coding means for providing said data transmission system with pulse code modulation in which a code word comprises eight bits, wherein said code word is employed for frame synchronization and the bit positions 2, 3, 4, 6, 7 and 8 include the bits to be corrected and the bit position 5 forms a part of the uncorrected monitoring signal.

5. A data transmission system as claimed in claim 2, comprising multiplex means operable to provide time division multilplex operation of said data system, means for detecting frame synchronization of the multiplex operation and wherein said means for inverting at least one bit in the uncorrected part of the monitoring signal includes means operable to provide such bit inversion in response to a frame synchronization fault, and means responsive to every incorrect frame synchronization word received at an intermediate station for inverting at least one bit of the uncorrected part of the frame synchronization word.

* * * * *